Patented May 3, 1949

2,469,330

UNITED STATES PATENT OFFICE 2,469,330

METHOD FOR PREVENTING ARSENICAL INJURY TO PLANTS

John H. Davidson, United States Navy, South Haven, Mich., assignor to The Dow Chemical Company, Midland, Mich., a corporation of Delaware No Drawing. Application December 3, 1943, Serial No. 512,845

4 Claims. (Cl. 47—58)

This invention is concerned with the prevention of arsenical injury to plants and is particularly directed to a method for modifying arsenical spray compositions and supplementing spray programs so as to avoid such injury to fruit and foliage of plants as has characterized previous pest control operations.

Metal arsenates, and particularly lead and calcium arsenates, have been widely employed as stomach poisons for the control of codling moth, tent caterpillar, rose chafers, and leaf eating insects generally. The parasiticidal effectiveness of these compounds is well established, but certain disadvantages in their use are recognized.

A major problem encountered in the insecticidal application of lead arsenate is that of foliage injury. Thus apple and other fruit trees, when sprayed with aqueous dispersions of the arsenate, show a bronzing of their foliage and a premature defoliation near the end of the growing season. These outward manifestations appear to be accompanied by a reduction in the vigor of the plant or tree, whereby poorly developed or small fruit may be obtained and a high rate of fruit drop encountered. Efforts to correct the latter condition through the use of harvest sprays have not been successful with trees which exhibit the effects of arsenical injury.

A number of safening agents have been suggested for use with the arsenates to cut down or eliminate arsenical injury. Representative of such materials are copper sulfate, lime, and zinc sulfate. These modifiers have not been particularly satisfactory in use. None has any particular insecticidal value, and their application either alone or in combination with lead arsenate often results in such a heavy deposit of spray residues on the fruit that normal color development is not obtained. Also, the presence of these materials on the plant surfaces appears to favor the build-up of high populations of red mite. The exact reason for this is not known, although it is possible that the combination of materials may destroy natural predators for the mites and thereby favor the increase of the latter. All of the foregoing disadvantages point to the inadequacy of present safening methods and the need for new and improved procedures for the prevention of arsenical injury on growing plants.

According to the present invention, it has been discovered that arsenical injury to plants and particularly trees may be largely avoided by supplementing the conventional arsenical spray program with treatment of the plant surfaces with a 2.4-dinitrophenol or an amine salt thereof. Such supplementary treatment may be accomplished by the addition of the dinitrophenol or amine salt directly to the arsenate composition and thereafter applying the mixture according to the usual spray practice. This procedure yields a safened arsenate concentrate or spray mixture which may be subsequently employed in the amounts necessary to control insect pests without material injury to the plant. An alternate procedure includes applying the dinitrophenol or its amine salt separately as a constituent of either a spray or dust. Such separate application is made during the summer growing season and shortly before or after the application of the arsenate composition, or alternated with a multiplicity of arsenate applications. In any event the presence of the phenolic safener on the trees either materially reduces or completely prevents the bronzing and premature defoliation of plants and trees whereby improved fruit development and reduction of fruit drop are obtained. Also, such modification of the arsenate composition or supplementing of the conventional spray program results in the control of red spider infestation whereby injury attributable thereto is substantially avoided.

The amounts of the dinitrophenol or dinitrophenol amine salt employed in accordance with the present invention vary considerably with the compound selected and the tolerance for nitrophenolic materials of the particular plant to be treated. The 2.4-dinitrophenols when employed in spray compositions, are preferably used in the amount of from 0.5 to 6 ounces per 100 gallons of ultimate mixture. When the amine salts of these compounds are employed, somewhat larger amounts are satisfactory, e. g. from 0.5 to 8 ounces per 100 gallons. This variation in operable and preferred amounts is illustrated by the optimum proportions of 2.4-dinitro-6-methyl-phenol and of the dicyclohexylamine salt of 2.4-dinitro-6-cyclohexyl-phenol which are from 2 to 6 ounces and from 2 to 4 ounces per 100 gallons, respectively. For 2.4-dinitro-6-cyclohexyl-phenol and its nicotine salt, 5 ounces or less per 100 gallons are employed.

When the nitrophenolic materials are employed as constituents of dust compositions, somewhat greater concentrations are suitable. While any amounts not causing foliage injury can be used in the safening operation, from about 0.25 to 4 per cent of the effective agent in finely-divided carrier is best adapted to give the desired result. Among the solid finely-divided carriers which may be employed are diatomaceous earth, bleaching earth, talc, pyrophyllite, volcanic ash, gypsum, wood flours, bentonite, fuller's earth, etc. Various sticking agents and adhesives may be incorporated in the dust compositions as desired, e. g. petroleum oil and fish oil. Such dust mixtures are preferably applied either following the application of lead arsenate or alternated with a multiplicity of arsenate spray treatments.

Treatment of plants, and particularly of fruit trees according to the procedure herein described, not only prevents the bronzing and other visual primary effects of arsenical injury, but also provides for the concurrent control of red spider and other mite pests, the maturing of fruit of larger size, higher color, and better quality in general, the reduction of premature leaf and fruit drop, and an enhancing of the desirable effects of harvest sprays including such plant growth materials as alpha-naphthyl acetic acid, alpha-naphthyl acetamide, indole acetic acid, etc.

In determining the comparative efficiency of the present safeners and those previously employed, field determinations were carried out with acid lead arsenate and combinations thereof with finely-divided sulfur in conventional spray programs. Beginning with the end of May, acid lead arsenate alone and in combinations with elemental sulfur were applied in codling moth control programs in which the trees were sprayed at intervals of from 2 to 4 weeks throughout the balance of the spring and early summer. The safeners, both new and old, were incorporated in certain of the applications and the effectiveness of the nitrophenolic additaments compared with the results obtained with compositions supposedly safened with hydrated lime alone and compositions of hydrated lime with zinc sulfate. The points of comparison were the percentage drop of fruit during the 7 weeks preceding harvest, premature leaf drop, the average number of leaves per spur on the trees of each plot, and the presence or absence of red mite during and at the end of the spraying period. Observations were also made with respect to the effect produced by harvest spray materials when applied to representative trees in the several test plots.

*Composition B*

| Compound | Parts by Weight |
|---|---|
| 2.4-Dinitro-6-cyclohexyl-phenol | 40 |
| Soy bean flour | 20 |
| Bentonite | 40 |

This composition is hereinafter termed "2.4-dinitro-6-cyclohexyl-phenol safener."

*Composition C*

| Compound | Parts by Weight |
|---|---|
| 2.4-Dinitro-6-methyl-phenol | 40 |
| Bentonite | 56 |
| Dried sulfite waste liquor (GOULAC) | 4 |

This product is hereinafter termed "2.4-dinitro-6-methyl-phenol safener."

Determinations were carried out using acid lead arsenate alone and mixtures of acid lead arsenate with the several safeners to determine the effect exerted by the safeners as evidenced by the number of leaves per spur and premature leaf drop of treated trees. All materials were applied as constituents of aqueous sprays to mature Jonathan apple trees during the summer growing season. The following table sets forth the proportions of materials used in the several applications, the times of application, and the observed results with respect to leaves per spur and the percentage leaf drop of both treated and untreated trees.

TABLE I

| Materials | Amounts of Materials Per 100 Gallons on Various Dates of Application | | | | Average Number of Leaves Per Spur on July 14 | Per Cent Leaf Drop on August 23 |
|---|---|---|---|---|---|---|
| | June 22 | July 6 | July 22 | August 6 | | |
| | Pounds | Pounds | Pounds | Pounds | | |
| No Treatment | | | | | 5.34 | 43 |
| Acid lead arsenate | 4 | 4 | 4 | 4 | 5.18 | 68 |
| Acid lead arsenate | 4 | 4 | 4 | 4 | 6.31 | 50 |
| Amine salt safener | 1.25 | 1.25 | | | | |
| Acid lead arsenate | 4 | 4 | 4 | 4 | | |
| 2.4-Dinitro-6-cyclohexyl-phenol safener | 0.5 | 0.5 | 0.5 | 0.5 | 5.34 | 43 |
| Acid lead arsenate | 4 | 4 | 4 | 4 | | |
| 2.4-Dinitro-6-methyl-phenol safener | 0.5 | 0.5 | 0.5 | 0.5 | | 52 |

The following examples are illustrative of the invention but are not to be construed as limiting.

EXAMPLE 1

Various 2.4-dinitro-phenols and amine salts of 2.4-dinitro-phenols were compounded with inert carriers and wetting agents to produce compositions for use with acid lead arsenate as safeners. The following mixtures are representative:

*Composition A*

| Compound | Parts by Weight |
|---|---|
| Dicyclohexylamine salt of 2.4-dinitro-6-cyclohexyl-phenol | 20 |
| Gypsum | 74 |
| Bentonite | 5 |
| Sodium lauryl sulfate | 1 |

This mixture is hereinafter termed "amine salt safener."

From the foregoing it can be seen that acid lead arsenate, when applied in the conventional manner, caused substantial increase in the rate of defoliation of the treated trees and a significant reduction in the average number of leaves per spur. It is also evident that the presence of the several safening compositions in the arsenate spray mixtures reduced premature leaf drop due to arsenate application, and, in most instances, acted to promote the persistence of a normal number of leaves on spurs of the treated trees.

EXAMPLE 2

A series of determinations were carried out to compare the effectiveness of conventional safening agents with the amine salt safener as described in Example 1. In these operations hydrated lime and zinc sulfate were employed with lead arsenate and the responses of the trees treated with such mixtures compared with the results obtained in similar operations in which the amine salt safener was employed. Mature Baldwin apple trees were selected for treatment and observations made with respect to the per cent fruit drop during the 7 weeks preceding harvest, the average number of leaves per spur, and the peak mite population observed on the foliage of the treated trees. All of the test trees had been subjected to conventional delay dormant, pre-pink, pink, and petal-fall treatments with lead arsenate, lime sulfur, finely-divided sulfur, and hydrated lime in various combinations. The following table sets forth representative results as obtained in the several operations.

TABLE III

| Materials | Amounts of Materials Per 100 Gallons on Various Dates of Application | | | | | Average No. of Mites Per Leaf on July 7 | Per Cent Leaf Drop on September 27 | Harvest Spray Treatments As Carried Out on October 4 | |
|---|---|---|---|---|---|---|---|---|---|
| | June 14 | June 24 | July 8 | July 28 | August 9 | | | Materials and Amounts | Total Per Cent Fruit Dropped Up To Harvest Date on October 18 |
| Acid lead arsenate | *Pounds* 3 | *Pounds* 3 | *Pounds* 3 | *Pounds* 3 | *Pounds* 3 | 82 | 50 | None | 70 |
| Hydrated lime | 3 | 3 | 3 | 3 | 3 | | | Harvest Spray Concentrate— 4 oz. Per 100 Gal. | 75 |
| Zinc sulfate | | 1 | 1 | | 1 | | | | |
| Acid lead arsenate | 3 | 3 | 3 | 3 | 3 | 0.38 | 37 | None | 46 |
| Hydrated lime | | | 3 | 3 | | | | Harvest Spray Concentrate— 4 oz. Per 100 Gal. | 16 |
| Zinc sulfate | | | 1 | | | | | | |
| Amine salt safener | 1.25 | 1.25 | | | 1.25 | | | | |

TABLE II

| Materials | Amounts of Materials Per 100 Gallons on Various Dates of Application | | | | Percent Fruit Drop During 7 Weeks Preceding Harvest | Average Number of Leaves Per Spur | Mite Population at Peak |
|---|---|---|---|---|---|---|---|
| | May 27 | June 11 | June 25 | July 28 | | | |
| Sulfur | *Pounds* 5 | *Pounds* 4 | | | | | |
| Acid lead arsenate | 3 | 3 | 3 | 3 | 36.5 | 3.97 | |
| Amine salt safener | 1.25 | 1.25 | 1.25 | 1.25 | | | |
| Sulfur | 5 | 4 | | | | | Average of 5.8 mites per leaf. |
| Hydrated lime | 3 | | | | | | |
| Acid lead arsenate | 3 | 3 | 3 | 3 | 29.2 | 3.66 | |
| Amine salt safener | | 1.25 | 1.25 | 1.25 | | | |
| Sulfur | 5 | 4 | | | | | |
| Hydrated lime | 3 | 3 | 3 | 3 | 48.9 | 2.78 | 101.8 mites per leaf. |
| Acid lead arsenate | 3 | 3 | 3 | 3 | | | |
| Zinc sulfate | | | | 1 | | | |

From the foregoing it is apparent that the trees sprayed with acid lead arsenate and conventional safening agents had a significantly smaller number of leaves per spur and a much higher percentage fruit drop than trees treated with the combination of acid lead arsenate and the amine salt safener. A further important difference resided in the great reduction in the mite population on trees subjected to treatment with the mixtures containing the amine salt.

EXAMPLE 3

Further to establish the effects of arsenate injury on apples and the improved results obtained by the use of the amine salt safener, operations were carried out on Baldwin apple trees in which the arsenate treatment was followed by a "harvest spray" to prevent premature fruit drop. In these determinations the conventional safeners were again employed with acid lead arsenate and comparisons made with the results observed on trees given a modified treatment embodying lead arsenate combinations with the amine salt safener. The "harvest spray" concentrate employed consisted of a 3.5 per cent by weight mixture of alpha-naphthyl-acetic acid in a finely-divided water-soluble carrier. The following table gives the compositions employed, the dates of application, the effect on mite population at peak, the per cent of premature leaf drop, and the results obtained from application of the "harvest spray" in terms of delayed fruit drop.

EXAMPLE 4

Other compositions which may be employed for the safening of acid lead arsenate include the following:

*Composition D*

| Compound | Parts by Weight |
|---|---|
| Nicotine salt of 2.4-dinitro-6-cyclohexyl-phenol | 20 |
| Gypsum | 74 |
| Bentonite | 5 |
| Sodium lauryl sulfate | 1 |

This mixture is employed in the amount of from 10 to 20 ounces per 100 gallons of ultimate spray mixture to safen from 3 to 4 pounds of acid lead arsenate.

*Composition E*

| Compound | Parts by Weight |
|---|---|
| Monocyclohexylamine salt of 2.4-dinitro-6-cyclohexyl-phenol | 1.5 |
| Pyrophyllite | 98.5 |

Composition F

| Compound | Parts by Weight |
| --- | --- |
| Laurylamine salt of 2.4-dinitro-6-cyclohexyl-phenol | 1.7 |
| Petroleum oil | 2 |
| Volcanic ash | 96.3 |

Composition G

| Compound | Parts by Weight |
| --- | --- |
| Diphenylguanidine salt of 2.4-dinitro-6-n-hexyl-phenol | 1.5 |
| Petroleum oil | 2 |
| Walnut shell flour | 96.5 |

Composition H

| Compound | Parts by Weight |
| --- | --- |
| 2.4-dinitro-6-n-octyl-phenol | 1 |
| Volcanic ash | 94 |
| Walnut shell flour | 5 |

Each of the foregoing compositions, E, F, G, and H, is adapted to be applied as a dust to the foliage of trees and other plants following treatment with aqueous acid lead arsenate sprays.

I claim:

1. A method for preventing plant injury attributable to contact with acid lead arsenate which comprises the step of supplementing the conventional arsenical spray program by treatment of the plant surfaces during the summer growing season with a composition including 2.4-dinitro-6-methyl-phenol as an active ingredient.

2. A method for preventing plant injury attributable to contact with acid lead arsenate which comprises the steps of modifying the conventional acid lead arsenate spray with 2.4-dinitro-6-methyl-phenol in the amount of from 0.5 to 6 ounces per 100 gallons of spray mixture, and applying such modified spray to the plant surfaces.

3. A method for preventing plant injury attributable to contact with acid lead arsenate which comprises the step of supplementing the conventional arsenical spray program by treatment of the plant surfaces during the summer growing season with a composition including a 2.4-dinitrophenol as an active ingredient.

4. A method for preventing plant injury attributable to contact with acid lead arsenate which comprises the step of supplementing the conventional arsenical spray program by treatment of the plant surfaces during the summer growing season with a composition including 2.4-dinitro-6-cyclohexyl-phenol as an active ingredient.

JOHN H. DAVIDSON.

REFERENCES CITED

The following references are of record in the file of this patent:

UNITED STATES PATENTS

| Number | Name | Date |
| --- | --- | --- |
| 2,225,619 | Britton | Dec. 24, 1940 |
| 2,347,377 | Swaine | Apr. 25, 1944 |